United States Patent [19]

Fechner et al.

[11] Patent Number: 4,523,958
[45] Date of Patent: Jun. 18, 1985

[54] PIGMENT FORMULATIONS AND THEIR USE OF PIGMENTING GRAVURE PRINTING INKS AND FINISHES

[75] Inventors: Wolf D. Fechner, Dirmstein; Rudolf Polster, Frankenthal; Joachim Kranz, Ludwigshafen; Eduard Hartmann, Limburgerhof, all of Fed. Rep. of Germany

[73] Assignee: BASF Aktiengesellschaft, Ludwigshafen, Fed. Rep. of Germany

[21] Appl. No.: 475,698

[22] Filed: Mar. 15, 1983

[30] Foreign Application Priority Data

Mar. 26, 1982 [DE] Fed. Rep. of Germany ....... 3211165

[51] Int. Cl.$^3$ .................. C09B 47/04; C09B 47/08
[52] U.S. Cl. .................... 106/288 Q; 106/304; 106/308 N; 106/309; 260/242.2; 544/339
[58] Field of Search ............... 106/288 Q, 304, 308 N, 106/309; 260/242.2; 544/339

[56] References Cited

U.S. PATENT DOCUMENTS

| 3,772,048 | 11/1973 | Rhodes et al. | 106/288 Q |
| 3,951,679 | 4/1976 | Bernhard et al. | 106/304 |
| 4,255,203 | 3/1981 | Kranz et al. | 106/288 Q |
| 4,294,620 | 10/1981 | Sappok et al. | 106/288 Q |
| 4,350,534 | 9/1982 | Fechner et al. | 106/288 Q |

FOREIGN PATENT DOCUMENTS 14907 5/1982 European Pat. Off. .

Primary Examiner—John Kight
Assistant Examiner—Marvin L. Moore
Attorney, Agent, or Firm—Oblon, Fisher, Spivak, McClelland & Maier

[57] ABSTRACT

Readily dispersible formulations comprising (a) finely divided copper phthalocyanine and (b) an iron hexacyanoferrate-III pigment are obtained by thoroughly milling a mixture of (a) and (b).

The performance characteristics and tinctorial properties of the formulations comprising (a) and (b) can be improved by incorporating (c) a Mannich condensate obtained from 2-hydroxynaphthalene which may or may not possess 1 or 2 further $\beta$-OH groups, formaldehyde and a primary or secondary amine, (d) a compound of the formula K(-NH-CONH-R)$_2$, where K is 1,5-naphthylene or 4,4'-diphenylenemethane and R is $C_{12}$–$C_{18}$-alkyl, $C_{12}$–$C_{18}$-alkenyl, $C_8$–$C_{18}$-alkoxypropyl or $C_2$–$C_8$-alkoxyethyleneoxypropyl, (e) a $C_6$–$C_{18}$-alkylbenzenesulfonic acid and (f) a mixture of (e) with a basic copper phthalocyanine and/or a salt obtained by reacting (e) with the basic copper phthalocyanine.

The finishes and printing inks produced using the formulations have tinctorial properties and performance characteristics which are superior to those of finishes and inks obtained by mixing individually milled or dispersed components.

10 Claims, No Drawings

PIGMENT FORMULATIONS AND THEIR USE OF PIGMENTING GRAVURE PRINTING INKS AND FINISHES

BACKGROUND OF THE INVENTION

Field of the Invention

Copper phthalocyanine pigments and iron hexacyanoferrate-III pigments, eg. Milori blue (C. I. Pigment Blue 27, C.I. No. 77510), have been used in conjunction to an increasing extent for pigmenting gravure printing inks and finishes, for which purpose the two pigments, because of their different dispersibilities, are milled separately in solvents or solvent mixtures or in binder solutions. Milori blue is difficult to disperse, and a particularly large amount of energy is therefore required to mill (disperse) this pigment.

SUMMARY OF THE INVENTION

It is an object of the present invention to provide formulations which contain finely divided copper phthalocyanine and Pigment Blue 27, C.I. No. 77510, and are readily and completely dispersible in solutions of binders for gravure printing inks and finishes.

We have found that this object is achieved, and that a readily dispersible formulation of (a) finely divided copper phthalocyanine, which may contain not more than two chlorine atoms in the molecule, and (b) an iron hexacyanoferrate-III pigment is obtained, if a mixture of copper phthalocyanine and (b) is thoroughly milled.

Compared with a gravure printing ink produced from components (a) and (b) milled separately in the same binder, the gravure printing ink pigmented with the novel formulation possesses slightly increased color strength and gives prints of substantially higher gloss on acetate film and on aluminum foil.

DESCRIPTION OF THE INVENTION

This result was surprising since iron hexacyanoferrate-III pigments, eg. Milori blue, are damaged by thorough milling, for example in a ball mill, in the absence of a milling assistant.

The novel formulations can contain (a) and (b) in a weight ratio of from 1:6 to 9:1, preferably from 1:5 to 6:1, in particular from 1:2 to 2:1.

The formulations are obtained by thoroughly milling a mixture of copper phthalocyanine and the iron hexacyanoferrate-III pigment in a ball mill or a mill with a similar action, such as a vibratory mill or a planetary ball mill. For the industrial production of the formulations, a ball mill or a vibratory mill is preferably used.

The milling time depends on the particle size of the starting materials used, and can be from 5 to 25 hours. As a rule, a milling time of from 10 to 18 hours is sufficient. The finished mill base can be used directly for pigmenting, without further treatment.

Suitable copper phthalocyanines (CuPc) for (a) are the $\alpha$, $\beta$, $\gamma$, $\delta$ and $\epsilon$ modifications, which can contain not more than 2 chlorine atoms in the molecule and are prepared by any desired process (C.I. Pigment Blue, C.I. No. 74160). The thorough milling may effect conversion of one modification to another during this procedure. Moreover, since the mixture of (a) and (b) has to be thoroughly milled, it is preferable to employ crude CuPc.

Suitable components (b) are iron hexacyanoferrate-III pigments C.I. Blue 27, C.I. No. 77510, which are commercially available under the names Milori blue, Prussian blue, Berlin blue and iron blue, pigments of the Milori blue type being preferred.

The tinctorial properties and/or performance characteristics of the formulations according to the present invention can be further improved by incorporating special agents. Suitable agents for this purpose are (1) Compounds which are obtained by Mannich condensation of 2-hydroxynaphthalene which may or may not contain 1 or 2 further $\beta$-hydroxy groups, formaldehyde and a primary or secondary aliphatic, cycloaliphatic or aromatic monoamine, diamine, triamine or polyamine or a 5-membered or 6-membered heterocyclic compound containing an >NH group as a ring member, and possess from 1 to 6 $\beta$-hydroxynaphthyl groups (component (c)).

(2) Compounds of the general formula $$K\text{-}(NH\text{---}CO\text{---}NH\text{---}R)_2 \qquad \text{I}$$

where R is $C_{12}$–$C_{18}$-alkyl, $C_{12}$–$C_{18}$-alkenyl, $C_8$–$C_{18}$-alkoxypropyl or —$(CH_2)_3$—O—$(C_2H_4O)_n$—O—$R^1$, $R^1$ is $C_2$–$C_8$-alkyl or phenyl, n is 1, 2, 3 or 4 and K is 1,5-naphthylene or 4,4'-diphenylenemethane (component (d)).

(3) $C_6$–$C_{18}$-Alkylbenzenesulfonic acids which may or may not possess hydroxyl groups in the phenyl nucleus (component (e)).

(4) A mixture of (e) and a basic copper phthalocyanine of the formula

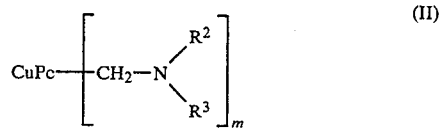

(II)

where CuPc is an m-valent radical of copper phthalocyanine, $R^2$ and $R^3$ independently of one another are each hydrogen or $C_1$–$C_8$-alkyl and m is 1, 2, 3 or 4, the weight ratio of (e) to (II) being from 0.8:1 to 1:0.8 (component (f)).

(5) Salts obtained by reacting (e) with a basic copper phthalocyanine of the formula II (component (g)).

Suitable components (c), (d), (e), (f) and (g) are described below.

Component (c) contains from 1 to 6 $\beta$-hydroxynaphthyl groups and is prepared by Mannich condensation of 2-hydroxynaphthalene which may or may not possess 1 or 2 further $\beta$-hydroxy groups, formaldehyde and a primary or secondary aliphatic, cycloaliphatic or aromatic monoamine, diamine, triamine or polyamine or a 5-membered or 6-membered heterocyclic compound which contains an >NH group as a ring member.

Suitable 2-hydroxynaphthalenes for the preparation of (c) are 2-hydroxynaphthalene itself, 2,7-dihydroxynaphthalene and 2,3-dihydroxynaphthalene. Condensates based on 2-hydroxynaphthalene and 2,7-dihydroxynaphthalene are preferred.

Examples of amines suitable for the preparation of (c) are primary and secondary aliphatic and cycloaliphatic monoamines, $C_2$- and $C_3$-alkylenediamines, di-$C_2$- and -$C_3$-alkylenetriamines and poly-($C_2$- and $C_3$-alkylene)-polyamines, cycloaliphatic diamines, aromatic diamines and 5-membered or 6-membered saturated or unsaturated heterocyclic compounds which contain an >NH group as a ring member. The compounds (c) are known, or are prepared in a conventional manner, (Houben-Weyl, Methoden der organischen Chemie, 4th edition, volume XI, page 731 et seq. (1957), Georg Thieme Verlag, Stuttgart).

Preferably, (c) is a compound of the general formula

  (III)

where $R^4$ is 2-hydroxynaphth-1-yl which may or may not possess 1 or 2 further β-hydroxyl groups, or is

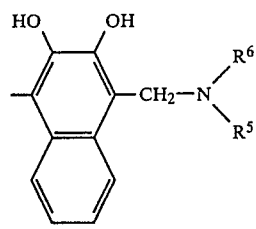

and X is a radical of the formula

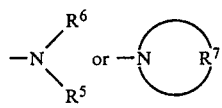

where $R^5$ and $R^6$ are identical or different and are each an aliphatic or phenyl-aliphatic radical, or $R^5$ is a group of the formula —$CH_2$—$R^4$ and $R^6$ is a group of the formula

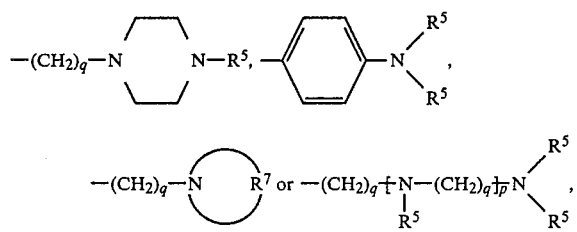

q is 2 or 3, p is 0, 1 or 2,

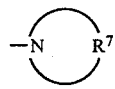

is a saturated or unsaturated 5-membered or 6-membered heterocyclic ring which may or may not contain —O— or >N—$R^8$ as a further ring member and/or one or two >C=O groups, and $R^8$ is $C_1$-$C_4$-alkyl.

Aliphatic and phenyl-aliphatic radicals $R^5$ and $R^6$ are, for example:

1. $C_1$-$C_5$-Alkyl, eg. methyl, ethyl, propyl, n- or isobutyl or pentyl;

2. $C_1$-$C_8$-Alkoxy-$C_2$- or -$C_3$-alkyl, eg. 2-methoxyethyl, 3-methoxypropyl, 2-ethoxyethyl, 3-ethoxypropyl, 2-n-butoxyethyl, 3-n-butoxyethyl, 2-(2'-ethylhexyloxy)-ethyl or 3-(2'-ethylhexyloxy)-propyl;

3. Alkoxyalkoxy-$C_2$- or -$C_3$-alkyl where alkoxyalkoxy is of 3 to 11 carbon atoms, eg. 2'-methoxy-2-ethoxyethyl, 2'-methoxy-3-ethoxypropyl, 3'-methoxy-3-propoxypropyl, 2'-ethoxy-2-ethoxyethyl, 2'-ethoxy-3-ethoxypropyl, 3'-ethoxy-3-propoxypropyl, 2'-propoxy-2-ethoxyethyl, 2'-propoxy-3-ethoxypropyl, 3'-propoxy-3-propoxypropyl, 2'-butoxy-2-ethoxyethyl, 2'-butoxy-3-ethoxypropyl, 3'-butoxy-3-propoxypropyl or 3'-(2''-ethylhexyloxy)-3-propoxypropyl;

4. Hydroxy-$C_2$- or -$C_3$-alkyl, eg. 2-hydroxyethyl, 2-hydroxypropyl or 3-hydroxypropyl;

5. N,N-Di-$C_1$-$C_4$-alkylamino-$C_2$-$C_3$-alkyl, eg. 2-(N,N-dimethylamino)-ethyl, 3-(N,N-dimethylamino)-propyl, 2-(N,N-diethylamino)-ethyl, 2-(N,N-dibutylamino)-ethyl, 3-(N,N-diethylamino)-propyl or 3-(N,N-dibutylamino)-propyl;

6. Phenyl-$C_1$-$C_4$-aralkyl, eg. benzyl, 2-phenylethyl, 2-phenylpropyl or 3-phenylpropyl; and

7.

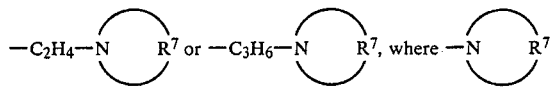

is a 5-membered or 6-membered saturated or unsaturated heterocyclic ring which may or may not contain —O— or >N—$R^8$ as a further ring member and/or one or two >CO groups, and $R^8$ is $C_1$-$C_4$-alkyl.

Suitable heterocyclic radicals

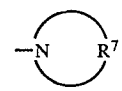

are, for example, those which are derived from morpholine, piperidine, pyrrolidone, pyrrolidine, pyrazole, N'-$C_1$-$C_4$-alkylpiperazine or phthalimide.

Preferred compounds of the formula (III) are those in which $R^4$ is 2,7-dihydroxynaphth-1-yl or 2-hydroxynaphth-1-yl.

Particularly preferred compounds from amongst these are those in which $R^5$ and $R^6$ have the meanings stated above under 1 to 7. Further particularly preferred compounds of the formula (III) are those in which $R^4$ is 2-hydroxynaphth-1-yl or 2,7-dihydroxynaphth-1-yl, X is

$R^5$ is —$CH_2$—$R^4$, $R^6$ is a radical of the formula

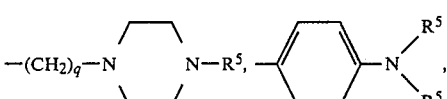

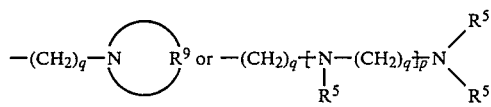

q is 2 or 3, p is 0, 1 or 2, and

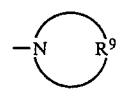

is a radical derived from morpholine or piperidine.

For economic reasons, very particularly preferred compounds for (c) are those of the formulae (IVa) and (IVb)

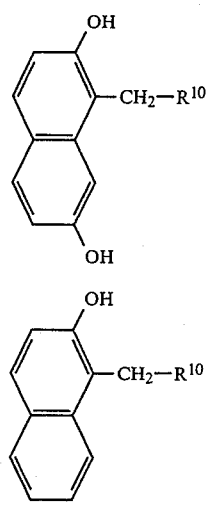

where $R^{10}$ is N-morpholinyl, N-piperidinyl, N-pyrrolidonyl, N-pyrazolyl, N-phthalimido, N-(N'-methylpyrazinyl) or N-(N'-ethylpyrazinyl), or di-$C_1$-$C_4$-alkylamino, eg. dimethylamino, diethylamino, dipropylamino or dibutylamino, or di-($C_1$-$C_4$-alkoxy-$C_2$ or $C_3$-alkylamino), eg. di-(2-methoxyethyl)-amino, di-(2-ethoxyethyl)-amino, di-(2-propoxyethyl)-amino, di-(2-butoxyethyl)-amino, di-(3-methoxypropyl)-amino, di-(3-ethoxypropyl)-amino or di-(3-butoxypropyl)-amino, or di-(2-hydroxyethyl)-amino or dibenzylamino.

The bisureas of the formula I which are suitable for component (d) are known (European Pat. No. 14,907).

From amongst these, compounds which are preferred for (d) are those in which K is 1,5-naphthylene and R is (1) $C_{13}$–$C_{18}$-Alkyl or alkenyl, eg. tridecyl, tetradecyl, hexadecyl, octadecyl or oleyl, (2) $C_8$–$C_{18}$-Alkoxypropyl, eg. 3-(2'-ethylhexyloxy)-propyl, 3-(n-octyloxy)-propyl, 3-nonyloxypropyl, 3-decyloxypropyl, 3-undecyloxypropyl, 3-dodecyloxypropyl, 3-pentadecyloxypropyl, 3-hexadecyloxypropyl, 3-octadecyloxypropyl, 3-($C_9$-$C_{11}$-alkoxy)-propyl, 3-($C_{12}$-$C_{14}$-alkoxy)-propyl or 3-($C_{16}$-$C_{19}$-alkoxy)-propyl, or (3) —$(CH_2)_3$—O—$(CH_2—CH_2O)_n$—$R^1$ where n is 2 or 3 and $R^1$ is ethyl, n-propyl, n-butyl or phenyl.

Owing to their pronounced effect on the formulations, particularly preferred compounds for (d) are those of the formula I where K is 1,5-naphthylene and R is tridecyl or 3-(2'-ethylhexyloxy)-propyl; the compound in which R has the latter meaning has a particularly pronounced effect, and is hence very particularly preferred.

Component (e) is, for example, a $C_6$-$C_{18}$-alkylbenzenesulfonic acid which is unsubstituted or substituted in the phenyl radical by hydroxyl, and in which alkyl can be linear or branched: 4-octylbenzenesulfonic acid, 4-nonylbenzenesulfonic acid, 4-decylbenzenesulfonic acid, 4-hexadecylbenzenesulfonic acid, 4-octadecylbenzenesulfonic acid, the corresponding alkylphenolsulfonic acids or mixtures of these acids. Dodecylbenzenesulfonic acid is preferred.

Suitable components (f) are mixtures of the alkylbenzenesulfonic acids mentioned under (e) with basic CuPc compounds of the formula II. The compounds of the formula II are known, those in which one or both of the radicals $R^2$ and $R^3$ are ethyl, propyl or butyl and m is on average from 2.5 to 4 being preferred. As a rule, a mixture of compounds in which m is 2, 3 and 4 is employed. The weight ratio of sulfonic acid to basic CuPc is in general from 0.8:1 to 1:0.8, in particular 1:1.

Instead of component (f), it is also possible to use a salt (g) obtained by reacting a stoichiometric amount of (e) with basic CuPc (II). Depending on the sulfonic acid used and the number of basic groups in (II), the weight ratio of (e) to (II) is as a rule from 0.8:1 to 1:0.8, preferably 1:1.

The formulations according to the present invention can contain one or more of the components (c) to (g) stated under (1) to (5). The formulation can contain not more than 7% by weight of components (c), (d) and/or (e), and/or not more than 15% by weight of (f) or (g), the percentages being based on the pigments (a+b).

Preferably the formulation contains from 3.5 to 6.5% by weight, based on (a+b), of each of the components (c), (e) and/or (d).

The amount of (f) or (g) is advantageously from 8 to 15, in particular from 10 to 12, % by weight, based on (a+b).

Where the formulation contains more than 2 of the components (c) to (g), the sum of these components is at maximum 25, preferably from 2.5 to 25, in partiular from 4 to 21, % by weight, based on (a+b).

Because of their tinctorial properties and performance characteristics, formulations which in addition to the pigments (a) and (b) contain the components (c) and (d), or (d) and (e), or (c), (d) and (e), or (c), (d) and (f), or (c), (d) and (g), are preferred.

Formulations comprising (a), (b), (c), (d) and (e) are particularly preferred.

The formulations are obtained by milling a mixture of the copper phthalocyanine, the iron hexacyanoferrate-III pigment and the desired or required components (c) to (g) in a ball mill.

In another procedure, the pigments are milled together with (c), (d) and (e) in a ball mill, the required amount of basic copper phthalocyanine II is added to the mill base, and the components are mixed until a homogeneous mixture is obtained.

The formulations are also obtained if the desired components are added to the mill base comprising (a) and (b), and the resulting mixture is homogenized by further milling in a ball mill or a mill with a similar action.

The preferred method of producing the formulations is the first-mentioned one in which a mixture of all the components is milled, since this method gives formulations having the best tinctorial properties and performance characteristics.

The formulations according to the present invention have the following advantages in respect of tinctorial properties and performance characteristics: (1) the pigments are readily dispersible; (2) the printing inks and finishes obtained using these formulations have advantageous viscosities in respect of processing; (3) the pigments are stable to flocculation; (4) the printing inks produced using the formulations contain the pigments in a very finely divided form, and hence give deep, pure and highly glossy prints which are highly transparent; (5) unstable modifications of copper phthalocyanine are stabilized in respect of conversion from one modification to the other; and (6) crystallization of the finely divided copper phthalocyanine is prevented or substantially reduced.

The Examples which follow illustrate the invention. Part and percentages are by weight. C.I. Pigment Blue 27, C.I. No. 77510, is referred to as Milori blue below.

The formulations obtained are processed as described under (A) to give toluene-based gravure printing inks. Baking finishes are produced as described under (C).

The method of testing toluene-bsed gravure printing inks is described under (B), and that for testing baking finishes is described under (D).

A. Toluene-based gravure printing ink/Preparation

1. In a 250 ml polyethylene beaker, an amount of the formulation corresponding to 12.0 g of pigment is added to 138 g of a 35% strength solution of a printing ink binder based on a phenol/formaldehyde condensate. 300 g of glass balls (diameter 3–4 mm) are added, and the mixture is then worked in a (RED-DEVIL ®) vibratory mill for 5 minutes. The ink is passed through a sieve to remove the glass balls (ink 1).

2. The ink is produced as described under (A1), except that the mixture is worked in the vibratory mill for 30 minutes (ink 2).

B. Toluene-based gravure printing ink/Test method

1. Viscosity of the ink:

This is determined by measuring the efflux time from a DIN cup with a nozzle of 4 mm diameter.

2. Gloss of the colorations:

2.1 This is measured against a black glass standard, at an angle of 45°, using a gloss-measuring apparatus from Gardener. The gloss value is given as a number of scale divisions, according to Gardener.

2.2 The colorations used for the measurement are produced as follows: The inks obtained as described under (A2) are applied onto aluminum foil and onto polyethylene film with a 24 μm coil coater from Erichson, and the colorations are dried in the air.

3. Dispersibility/Difficulty of dispersing:

The inks 1 and 2 obtained as described under (A1) and (A2) are applied onto parchment paper with a knife coater, and the difference in depth between the coloration obtained with ink 1 and that obtained with ink 2 is assessed visually by comparison.

The difficulty of dispersing (DH) is 0 if both colorations are of the same depth. The dispersibility is rated on a scale from 1 to 6, 1 corresponding to a small difference in depth and 6 corresponding to a very large difference in depth (great difficulty of dispersing). A positive mark indicates that the coloration obtained with ink 1 is deeper than that obtained with ink 2, whereas a negative note indicates that the depth increases when dispersing is carried out for a longer time, ie. ink 2 has greater color strength than ink 1.

C. Baking finish/Preparation

1. Colored finish:

In a 250 ml polyethylene beaker, an amount of the formulation corresponding to 5 g of pigment is added to 95 g of a baking finish based on an alkyd/melamine resin (35% strength solution in xylene), 100 ml of glass balls (3 mm diameter) are added, and the mixture is then worked in a vibratory mill for 60 minutes.

2. Full-shade finish:

5 g of the colored finish (C1) are mixed with the same amount of a clear finish based on alkyd/melamine resin (35% strength solution in xylene).

3. White reduction:

4 g of the colored finish (C1) are mixed with 12.5 g of a white finish (40% strength in titanium dioxide).

D. Baking finish/Methods of testing the coating

1. Full-shade finish 1.1 The full-shade finish obtained as described in (C2) is applied, by means of a 24 μm coil coater, onto cardboard printed with a contrast pattern. The coating is air-dried for 20 minutes and then baked for 15 minutes at 120° C.

1.2 The coating is assessed visually in respect of gloss, color purity and transparency relative to a comparative coating.

2. White reduction/Depth 2.1 The white reduction obtained as described in (C3) is applied onto cardboard by means of a 150 μm coil coater, and the coating is air-dried for 20 minutes and then baked for 30 minutes at 120° C.

2.2 The coatings are assessed colorimetrically, in accordance with the CIELAB system, in respect of depth, hue (H) and color purity (C) (Dr. Fritz Heinrich, defazet 8 (1977), 318–324). The depth is expressed relative to a value of 100 for the comparison (color equivalent, CE).

3. White reduction/Difficulty of dispersing

The difficulty of dispersing (DH) is determined with the aid of two white reduction colorations.

3.1 White reduction 1 is prepared as described in (C1) and (C3), except that the pigment or the formulation used for producing the colored finish (C1) is dispersed in the vibratory mill for only 6 minutes. White reduction 2 is obtained as described in (C3).

3.2 Using the white reductions 1 and 2, coatings are produced as described under (D2.1); these coatings are baked.

3.3 To determine the difficulty of dispersing, the coatings obtained as described in (D3.2) are assessed as described in (D2.2) in respect of the depth of the colorations.

The difficulty of dispersing (DH) is calculated from the depth of colorations 1 and 2, in accordance with the formula $$DH = \left( \frac{F2}{F1} - 1 \right) \cdot 100$$

From the formula, it can be seen that the difficulty of dispersing is smaller the smaller the difference in the depths of the colorations (coatings) obtained with white reductions 1 and 2.

EXAMPLE 1

(a) 400 g of a 2:1 mixture of crude chlorine-free copper phthalocyanine and C.I. Pigment Blue 27 (C.I. No. 77510, Milori blue) are introduced into a vibratory mill which has a capacity of 4 liters and is charged with 8 kg of steel balls of 2.5 cm diameter, and the mixture is milled for 15 hours.

(b) The finished mill base is converted, as described in (A1) and (A2), to toluene-based gravure printing inks, and these are tested:

(α) in respect of viscosity, in accordance with (B1);

(β) in respect of the color strength on parchment. For this purpose, the ink obtained as described in (A2) is applied onto parchment with a knife coater, as described under (B3). The color strength is expressed as a color equivalent (CE), relative to a value of 100 for the color strength of the gravure printing ink of Comparison I. The latter is obtained by milling finely divided copper phthalocyanine (a) and Milori blue (b) separately in the same binder, and then mixing these two components;

(γ) in respect of gloss on polyethylene film and on aluminum foil, in accordance with (B2);

(δ) in respect of dispersibility, in accordance with (B3).

The results of the tests are summarized in Table (Ib).

EXAMPLES 2 TO 24

(a) The formulation is prepared in the manner described in Example 1, by milling a mixture of crude copper phthalocyanine (a), Milori blue (b), the compound of the formula

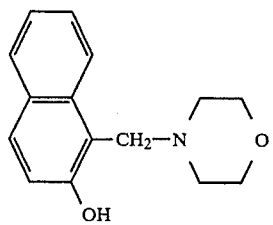

as component (c), the compound of the formula

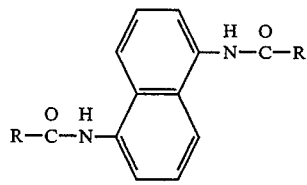

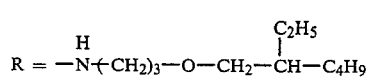

as component (d), dodecylbenzenesulfonic acid as component (e) and/or a 1:1 mixture of dodecylbenzenesulfonic acid with the basic copper phthalocyanine of the formula

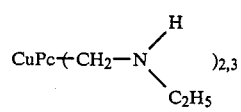

as component (f), or a salt of dodecylbenzenesulfonic acid with the above basic copper phthalocyanine as component (g).

The amounts of (a+b), (c), (d), (e), (f) and/or (g) used are summarized in Tables Ia to IIIa, and the milling times are shown in column 8 of the Tables.

(b) The formulations obtained are converted, as described in (A1) and (A2), to toluene-based gravure printing inks, and these are tested (α) in respect of viscosity, in accordance with (B1);

(β) in respect of the color strength on parchment. For this purpose, the ink obtained as described in (A2) is applied onto parchment with a knife coater, as described under (B3). The color strength is expressed as a color equivalent (CE), relative to a value of 100 for the color strength of the gravure printing ink of Comparison I. The latter is obtained by milling finely divided copper phthalocyanine (a) and Milori blue (b) separately in the same binder, and then mixing these two components;

(γ) in respect of gloss on polyethylene film and on aluminum foil, in accordance with (B2);

(δ) in respect of dispersibility, in accordance with (B3).

The results of the tests are summarized in Tables (Ib) to (IIIb).

TABLE Ia

| Example | Pigment (a):(b) = 2:1 [parts] | Component (c) [parts] | (d) [parts] | (e) [parts] | (f) [parts] | (g) [parts] | Milling time [h] |
|---|---|---|---|---|---|---|---|
| 1 | 100 | 0 | 0 | 0 | 0 | 0 | 15 |
| 2 | 90 | 5 | 0 | 5 | 0 | 0 | 15 |
| 3 | 90 | 0 | 5 | 5 | 0 | 0 | 15 |
| 4 | 95 | 5 | 0 | 0 | 0 | 0 | 15 |
| 5 | 88 | 3.5 | 3.5 | 5 | 0 | 0 | 15 |
| 6 | 88 | 3.5 | 3.5 | 0 | 5 | 0 | 15 |
| 7 | 83 | 3.5 | 3.5 | 5 | 5 | 0 | 15 |
| 8 | 83 | 3.5 | 3.5 | 5 | 5 | 0 | 5 |
| 9 | 83 | 3.5 | 3.5 | 5 | 5 | 0 | 10 |
| 10 | 83.5 | 3.5 | 3.5 | 0 | 0 | 9.5 | 5 |
| 11 | 83.5 | 3.5 | 3.5 | 0 | 0 | 9.5 | 10 |
| 12 | 83.5 | 3.5 | 3.5 | 0 | 0 | 9.5 | 15 |
| Comp. I | Printing ink produced by mixing a printing ink containing (a) with one containing (b). | | | | | | |

TABLE Ib

| | Results of tests | | | | |
|---|---|---|---|---|---|
| | Viscosity | Color | Gloss | | |
| Example | DIN cup [s] | strength CE | PE-film | Al-foil | Dispersibility |
| 1 | 41 | 98 | 98.1 | 114.8 | 0 DH = 0 |
| 2 | 34 | 94 | 101.8 | 116.6 | 0 |
| 3 | 33 | 94 | 103.7 | 129.6 | +1 |
| 4 | 40 | 100 | 100.0 | 114.8 | +1 |
| 5 | 21 | 92 | 101.8 | 120.3 | 0 |
| 6 | 25 | 85 | 83.3 | 103.7 | −4 |
| 7 | 52 | 81 | 107.4 | 131.4 | 0 |
| 8 | 26 | 92 | 101.8 | 127.7 | 0 |
| 9 | 39 | 89 | 103.7 | 127.7 | −2 |
| 10 | 26 | 94 | 100.0 | 111.1 | −1 |
| 11 | 46 | 80 | 103.7 | 120.3 | −2 |
| 12 | 48 | 87 | 107.4 | 133.3 | −4 |
| Comp. I | 39 | 100 | 87.0 | 103.7 | −4 |

TABLE IIa

| Example | Pigment (a):(b) min [parts] | Component (c) [parts] | (d) [parts] | (e) [parts] | (f) [parts] | (g) [parts] | Milling time [h] |
|---|---|---|---|---|---|---|---|
| 13 | 4:1 | 3.5 | 3.5 | 5 | 0 | 0 | 15 |
| Comp. II | 88 (1) | | | | | | |
| 14 | 1:1 | 3.5 | 3.5 | 5 | 0 | 0 | 15 |
| Comp. III | 88 (1) | | | | | | |
| 15 | 1:4 | 3.5 | 3.5 | 5 | 0 | 0 | 15 |
| Comp. IV | 88 (1) | | | | | | |
| 16 | 1.5:8.5 | 3.5 | 3.5 | 5 | 0 | 0 | 15 |
| Comp. V | 88 (1) | | | | | | |

(1) Printing ink produced by mixing a printing ink containing (a) with one containing (b).

TABLE IIb

| Example | Viscosity DIN cup [s] | Color strength CE | Gloss PE-film | Gloss Al-foil | Dispersi-bility |
|---|---|---|---|---|---|
| 13 | 27 | 9 | 101.8 | 125.9 | +5 |
| Comp. II | 22 | 100 | 98.1 | 124.0 | −1 |
| 14 | 47 | 89 | 101.8 | 120.3 | 0 |
| Comp. III | 20 | 100 | 87.0 | 100 | −4 |
| 15 | 46 | 89 | 90.7 | 100 | −2 |
| Comp. IV | 16 | 100 | 79.6 | 87 | −6 |
| 16 | 35 | 97 | 96.2 | 98.1 | −2 |
| Comp. V | 16 | 100 | 79.6 | 85.1 | −6 |

TABLE IIIa

| Example | Pigment (a):(b) = 1:2 [parts] | Component (c) [parts] | (d) [parts] | (e) [parts] | (f) [parts] | (g) [parts] | Milling time [h] |
|---|---|---|---|---|---|---|---|
| 17 | 83 | 3.5 | 3.5 | 5 | 5 | 0 | 15 |
| 18 | 83.5 | 3.5 | 3.5 | 0 | 0 | 9.5 | 15 |
| 19 | 95 | 0 | 0 | 5 | 0 | 0 | 15 |
| 20 | 90 | 5 | 0 | 5 | 0 | 0 | 15 |
| 21 | 90 | 0 | 5 | 5 | 0 | 0 | 15 |
| 22 | 95 | 5 | 0 | 0 | 0 | 0 | 15 |
| 23 | 88 | 3.5 | 3.5 | 5 | 0 | 0 | 15 |
| 24 | 100 | 0 | 0 | 0 | 0 | 0 | 15 |
| Comp. VI | (1) | | | | | | |

(1) see Table IIa

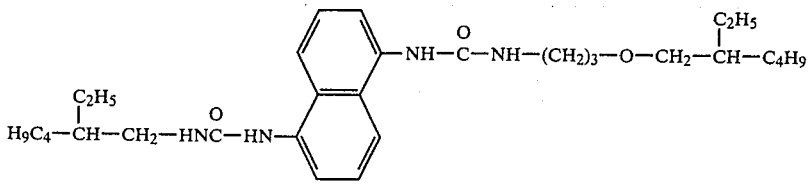

TABLE IIIb

| Example | Viscosity DIN cup [s] | Color strength CE | Gloss PE-film | Gloss Al-foil | Dispersi-bility |
|---|---|---|---|---|---|
| 17 | 22 | 80 | 103.7 | 125.9 | −1 |
| 18 | 36 | 83 | 101.8 | 114.8 | −1 |
| 19 | 17 | 93 | 98.1 | 112.9 | +1 |
| 20 | 19 | 100 | 101.8 | 118.5 | +1 |
| 21 | 26 | 83 | 101.8 | 120.3 | +2 |
| 22 | 17 | 100 | 85.1 | 92.5 | 0 |
| 23 | 18 | 78 | 100.0 | 111.1 | +3 |
| 24 | 17 | 100 | 74 | 83.3 | −4 |
| Comp. VI | 21 | 100 | 75.9 | 87.0 | −6 |

EXAMPLES 25 TO 41

(a) The formulation is produced by milling 88 parts of a mixture of crude copper phthalocyanine (a) and Milori blue (b) in the ratio 1:2, together with 3.5 parts of component (c) shown in Table IV, 3.5 parts of the compound as component (d) and 5 parts of dodecylbenzenesulfonic acid as component (e), in a ball mill.

(b) The formulations obtained according to (a) are converted, as described in (A1) and (A2), to toluene-based gravure printing inks, and these are tested:

(α) in respect of viscosity, in accordance with (B1);

(β) in respect of color strength on parchment (cf. Example (2b)(β));

(γ) in respect of gloss on polyethylene film and on aluminum foil, in accordance with (B2); and (δ) in respect of dispersibility, in accordance with (B3).

The results of the tests are summarized in Table IV.

TABLE IV

| Example | Component (c) | (α) Viscosity [s] | (β) Color strength CE | (γ) Gloss PE-film | (γ) Gloss Al-foil | (δ) Dispersibility |
|---|---|---|---|---|---|---|
| 25 | 1-(piperidinomethyl)-2,7-dihydroxynaphthalene | 30 | 83 | 101.8 | 118.5 | −1 |
| 26 | 1-(piperidinomethyl)-2-hydroxynaphthalene | 29 | 85 | 101.8 | 122.0 | 0 |
| 27 | 1-(phthalimidomethyl)-2-hydroxynaphthalene | 30 | 83 | 103.7 | 120.5 | −3 |
| 28 | 1-(dimethylaminomethyl)-2-hydroxynaphthalene | 31 | 91 | 101.8 | 125.9 | −2 |
| Comp. VI | 0 | 21 | 100 | 75.9 | 87.0 | −6 |
| 29 | {1-(hydroxy)naphthalen-CH$_2$-}$_2$N—(CH$_2$)$_3$—N(CH$_3$)$_2$ | 32 | 85 | 101.8 | 120.3 | −1 |

TABLE IV-continued
| Example | Component (c) | (α) Viscosity [s] | (β) Color strength CE | (γ) Gloss PE-film | (γ) Gloss Al-foil | (δ) Dispersibility |
|---|---|---|---|---|---|---|
| 30 | 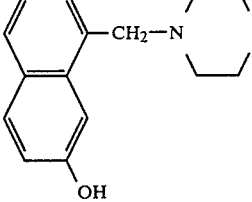 | 39 | 83 | 103.7 | 124.0 | −1 |
| 31 | 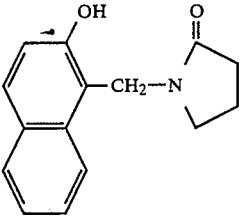 | 24 | 83 | 103.7 | 129.6 | −2 |
| 32 | 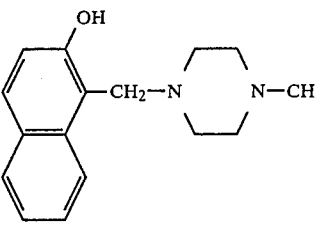 | 40 | 81 | 101.8 | 125.9 | −2 |
| Comp. VI | 0 | 21 | 100 | 75.9 | 87.0 | −6 |
$Y = $ 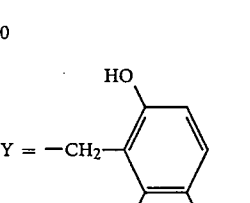
| 33 | Y—NH—CH$_2$—CH$_2$—NH—Y | 23 | 83 | 103.7 | 124.0 | 0 |
| 34 | Y—N—[(CH$_2$)$_3$N—(Y)$_2$]$_2$ | 26 | 83 | 103.7 | 125.9 | −1 |
| 35 | 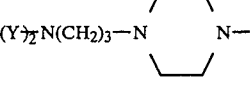 | 32 | 83 | 103.7 | 125.9 | −2 |
| 36 | 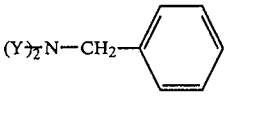 | 27 | 85 | 103.7 | 127.7 | −3 |
| 37 | 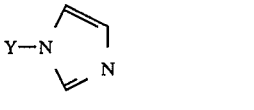 | 26 | 85 | 103.7 | 133.3 | −1 |
| 38 | Y—N—[(CH$_2$)$_2$—OCH$_3$]$_2$ | 25 | 85 | 103.7 | 125.9 | −1 |
| 39 | 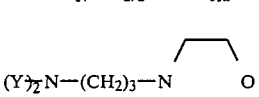 | 35 | 83 | 101.8 | 118.5 | −1 |

TABLE IV-continued

| Example | Component (c) | (α) Viscosity [s] | (β) Color strength CE | (γ) Gloss PE-film | (γ) Gloss Al-foil | (δ) Dispersibility |
|---|---|---|---|---|---|---|
| 40 | (Y)₂N—CH₂—CH₂—OH 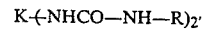 | 26 | 83 | 103.7 | 98.1 | −2 |
| 41 | Y—HN—⟨benzene⟩—NH—Y 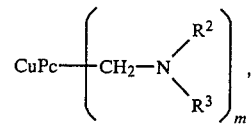 | 24 | 83 | 103.7 | 120.3 | 0 |
| Comp. VI | 0 | 21 | 100 | 75.9 | 87.0 | −6 |

EXAMPLE 42

(a) 83 parts of a 2:1 mixture of crude copper phthalocyanine and Milori blue are milled together with 3.5 parts of 1-(morpholinomethylene)-2-hydroxynaphthalene (component c), 3.5 parts of the reaction product of 1 mole of 1,5-naphthylene diisocyanate with 2 moles of 3-(2′-ethylhexyloxy)-propylamine (component d) and 10 parts of a 1:1 mixture of dodecylbenzenesulfonic acid with CuPc(CH₂NHC₂H₅)₂,₃ (component f) for 15 hours in a ball mill.

(b) Using formulation (a), full-shade coatings and white reductions are obtained as described in (C2) and (C3), respectively, and in (D1) and (D2), respectively.

The full-shade coating is substantially more transparent than a coating produced with a pigment based on copper phthalocyanine. The white reduction coloration is compared with a white reduction based on the above surface-coating pigment, and the following results are obtained:

|  | White reduction CE | DH | Rub-out | Transparency of full-shade coating |
|---|---|---|---|---|
| (a) | 89 | 57 | 95 | substantially more transparent than Comparison |
| Surface-coating pigment CuPc (Comparison) | 100 | 62 | 95 |  |

The hue of the white reduction coloration containing (a) is substantially redder than that of the Comparison.

We claim:

1. A formulation containing
   (a) a finely divided copper phthalocyanine which is unsubstituted or monosubstituted or disubstituted by chlorine, and
   (b) an iron hexacyanoferrate-III pigment, which formulation is obtained by thoroughly milling a mixture of (a) and (b).

2. The formulation as claimed in claim 1, wherein the weight ratio of (a) to (b) is from 1:6 to 9:1.

3. The formulation as claimed in claim 1, which in addition to (a) and (b) contains
   (c) one or more compounds which are obtained by Mannich condensation of 2-hydroxynaphthalene which may or may not contain 1 or 2 further β-hydroxy groups, formaldehyde and a primary or secondary aliphatic, cycloaliphatic or aromatic monoamine, diamine, triamine or polyamine or a 5-membered or 6-membered saturated heterocyclic compound containing an >NH group as a ring member, and possess from 1 to 6 β-hydroxynaphthyl groups,
   (d) one or more compounds of the formula $$K + NHCO—NH—R)_{2'}$$

where K is 1,5-naphthylene or 4,4′-diphenylenemethane and R is $C_{12}$–$C_{18}$-alkyl, $C_{12}$–$C_{18}$-alkenyl or 3-($C_8$–$C_{18}$-alkoxy)-propyl,
   (e) not less than one $C_6$–$C_{18}$-alkylbenzenesulfonic acid or one $C_6$–$C_{18}$-alkylphenolsulfonic acid,
   (f) a mixture of (e) with a basic copper phthalocyanine of the formula

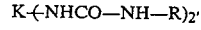

$$CuPc + CH_2—N\begin{matrix}R^2\\R^3\end{matrix})_m,$$

where CuPc is an m-valent radical of copper phthalocyanine, $R^2$ and $R^3$ independently of one another are each hydrogen or $C_1$–$C_8$-alkyl, and m is 1, 2, 3 or 4, the weight ratio of (e) to basic copper phthalocyanine being from 0.8:1 to 1:0.8, and
   (g) one or more salts obtained by reacting (e) with the basic copper phthalocyanine mentioned under (f), or a mixture of two or more of the components stated under (c), (d), (e), (f) and (g), and wherein the amounts of each of the components (c), (d) and (e) are not more than 7% by weight, the amount of (f) or (g) is not more than 15% by weight, and the sum (c+d+e+f+g) is at maximum 25% by weight, the percentages being based on (a)+(b).

4. A formulation as claimed in claim 2, which in addition to (a) and (b) contains
   (c) one or more compounds which are obtained by Mannich condensation of 2-hydroxynaphthalene which may or may not contain 1 to 2 further β-hydroxy groups, formaldehyde and a primary or secondary aliphatic, cycloaliphatic or aromatic monoamine, diamine, triamine or polyamine or a 5-membered or 6-membered saturated heterocyclic compound containing an >NH group as a ring member, and possess from 1 to 6 β-hydroxynaphthyl groups,
   (d) one or more compounds of the formula $$K + NHCO—NH—R)_{2'}$$

where K is 1,5-naphthylene or 4,4′-diphenylenemethane and R is $C_{12}$–$C_{18}$-alkyl, $C_{12}$–$C_{18}$-alkenyl or 3-($C_8$–$C_{18}$-alkoxy)-propyl, (e) not less than one $C_6$–$C_{18}$-alkylbenzenesulfonic acid or one $C_6$–$C_{18}$-alkylphenolsulfonic acid,
(f) a mixture of (e) with a basic copper phthalocyanine of the formula

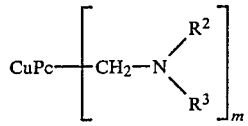

where CuPc is an m-valent radical of copper phthalocyanine, $R^2$ and $R^3$ independently of one another are each hydrogen or $C_1$–$C_{18}$-alkyl, and m is 1, 2, 3 or 4, the weight ratio of (e) to basic copper phthalocyanine being from 0.8:1 to 1:0.8, and (g) one or more salts obtained by reacting (e) with the basic copper phthalocyanine mentioned under (f), or a mixture of two or more of the components stated under (c), (d), (e), (f) and (g), and wherein the amounts of each of the components (c), (d) and (e) are not more than 7% by weight, the amount of (f) or (g) is not more than 15% by weight, and the sum (c+d+e+f+g) is at maximum 25% by weight, the percentages being based on (a)+(b).

5. A formulation as claimed in claim 2, which in addition to (a) and (b) contains, as (c), a compound of the formula $R^4$—$CH_2$—X where $R^4$ is 2-hydroxynaphth-1-yl or 2,7-dihydroxynaphth-1-yl and X is a radical of the formula

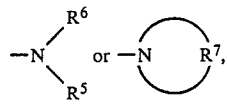

where $R^5$ and $R^6$ are identical or different and are each $C_1$–$C_5$-alkyl, $C_1$–$C_8$-alkoxy-$C_2$- or -$C_3$-alkyl, alkoxyalkoxy-$C_2$ or -$C_3$-alkyl where alkoxyalkoxy is of 3 to 11 carbon atoms, hydroxy-$C_2$- or -$C_3$-alkyl, N,N-di-$C_1$–$C_4$-alkylamino-$C_2$- or -$C_3$-alkyl, phenyl-$C_1$–$C_4$-alkyl,

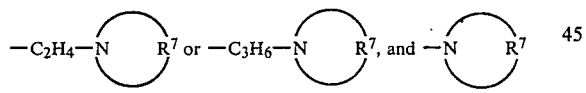

is a morpholinyl, piperidinyl, pyrrolidonyl, pyrrolidinyl, pyrazolyl, N'-$C_1$–$C_4$-alkylpiperazinyl or N-phthalimido radical, or $R^5$ is a radical of the formula —$CH_2$—$R^4$ and $R^6$ is a group of the formula

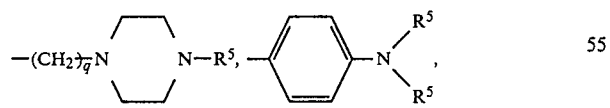

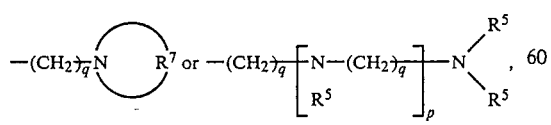

q is 2 or 3 and p is 0, 1 or 2.

6. A formulation as claimed in claim 4, which in addition to (a) and (b) contains
(c) one or more compounds of the formula $R^4$—$CH_2$—X, where $R^4$ is 2-hydroxynaphth-1-yl or 2,7-dihydroxynaphth-1-yl, X is

$R^5$ is —$CH_2$—$R^4$, $R^6$ is a radical of the formula

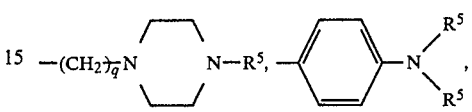

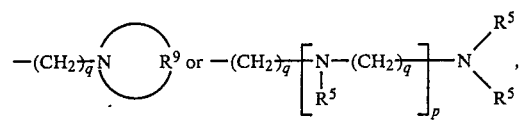

q is 2 or 3, p is 0, 1 or 2 and

is a morpholinyl or piperidinyl radical,
(d) one or more compounds of the formula $$K\text{-}(\text{NHCO—NH—R})_2$$

where K is 1,5-naphthylene, R is $C_{13}$–$C_{18}$-alkyl, $C_{13}$–$C_{18}$-alkenyl, $C_8$–$C_{18}$-alkoxypropyl or —($CH_2$)$_3$O—($C_2H_4O$)$_n R^1$, n is 2 or 3 and $R^1$ is ethyl, n-propyl, n-butyl or phenyl,
(e) one or more $C_6$–$C_{18}$-alkylbenzenesulfonic acids,
(f) a mixture of one or more $C_6$–$C_{18}$-alkylbenzenesulfonic acids with a compound of the formula

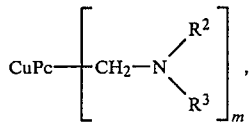

where CuPc is an m-valent radical of the copper phthalocyanine, one or both of the groups $R^2$ and $R^3$ are ethyl, propyl or butyl and m is on average from 2.5 to 4, or
(g) a salt of a $C_6$–$C_{18}$-alkylbenzenesulfonic acid and the compound of the formula

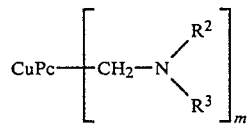

where CuPc, $R^2$, $R^3$ and m have the above meanings, or a mixture of two or more of the compounds stated under (c), (d), (e), (f) and (g).

7. A formulation as claimed in claim 6, which comprises (a), (b), (c) and (d), or (a), (b), (d) and (e), or (a), (b), (c), (d) and (e), or (a), (b), (c), (d) and (f), or (a), (b), (c), (d) and (g), and wherein the amounts of (c), (e) and (d) can each be from 3.5 to 6.5% by weight, the amount of (f) or (g) can be from 8 to 12% by weight, and the sum of components (c), (d), (e), (f) and (g) can be at maximum 25% by weight, the percentages being based on (a)+(b).

8. A formulation as claimed in claim 6, which in addition to (a) and (b) contains (c), (d) and (e), the amount of (c+d+e) being from 4 to 21% by weight, based on (a+b).

9. A formulation containing
(a) a finely divided copper phthalocyanine which is unsubstituted or monosubstituted or disubstituted by chlorine, and
(b) an iron hexacyanoferrate-III pigment, the ratio of (a):(b) being from 1:6 to 9:1,
(c) one or more compounds of the formula

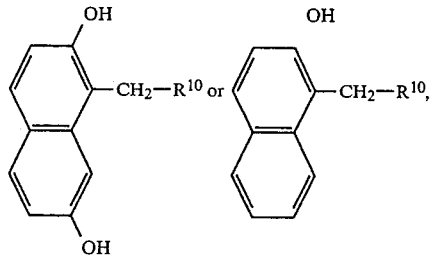

where $R^{10}$ is N-morpholinyl, N-piperidyl, N-pyrrolidonyl, N-pyrazolyl, N-phthalimido, N-(N'-methylpiperazinyl), N-(N'-ethylpiperazinyl), di-$C_1$-$C_4$-alkylamino, di-$C_1$-$C_4$-alkoxy-$C_2$- or $C_3$-alkylamino or dibenzylamino,
(d) one or more compounds of the formula

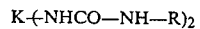

where K is 1,5-naphthylene and R is tridecyl or 3-(2'-ethylhexyloxy)-propyl,
(e) dodecylbenzenesulfonic acid,
(f) a mixture of dodecylbenzenesulfonic acid with a compound of the formula

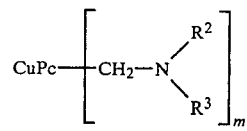

where CuPc is an m-valent radical of copper phthalocyanine, one or both of the radicals $R^2$ and $R^3$ are ethyl, propyl or butyl, and m is on average from 2.5 to 4, the weight ratio of sulfonic acid to the basic copper phthalocyanine being from 0.8:1 to 1:0.8, and
(g) a salt of the components mentioned under (f), which formulation is obtained by thoroughly milling (a) and (b) together and subsequently mixing in one or more of the additives staged under (c), (d), (e), (f) and (g), or by milling (a) and (b) together with one or more of the compounds mentioned under (c), (d), (e), (f) and (g), and the amounts of (c), (e) and (d) are each from 3.5 to 6.5% by weight, the amount of (f) or (g) is from 8 to 12% by weight, and the sum (c+d+e+f+g) is at maximum 25% by weight, the percentages being based on (a+b).

10. A formulation as claimed in claim 9, which comprises (a), (b), (c), (d) and (e), and wherein the content of (c+d+e) is from 4 to 21% by weight, based on (a+b).

* * * * *